United States Patent
Sparks et al.

(10) Patent No.: US 9,008,653 B2
(45) Date of Patent: Apr. 14, 2015

(54) SYSTEMS, METHODS, AND COMPUTER READABLE MEDIA FOR PROVIDING DYNAMIC STEERING OF ROAMING IN A TELECOMMUNICATIONS NETWORK

(75) Inventors: Robert J. Sparks, Plano, TX (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 404 days.

(21) Appl. No.: 12/542,667

(22) Filed: Aug. 17, 2009

(65) Prior Publication Data

US 2010/0075669 A1    Mar. 25, 2010

Related U.S. Application Data

(60) Provisional application No. 61/089,338, filed on Aug. 15, 2008.

(51) Int. Cl.
| | |
|---|---|
| *H04W 4/00* | (2009.01) |
| *H04W 8/18* | (2009.01) |
| *H04W 36/14* | (2009.01) |
| *H04W 48/08* | (2009.01) |

(52) U.S. Cl.
CPC .............. *H04W 8/183* (2013.01); *H04W 36/14* (2013.01); *H04W 48/08* (2013.01)

(58) Field of Classification Search
CPC ........... H04W 4/20; H04W 8/02; H04W 8/10; H04W 8/12; H04W 92/14
USPC .......... 455/433, 422.1, 435.2, 432.1; 370/338
See application file for complete search history.

(56) References Cited

U.S. PATENT DOCUMENTS

| | | | |
|---|---|---|---|
| 5,159,625 | A | 10/1992 | Zicker |
| 5,586,338 | A | 12/1996 | Lynch et al. |

(Continued)

FOREIGN PATENT DOCUMENTS

| | | |
|---|---|---|
| EP | 1 189 473 A2 | 3/2002 |
| KR | 2007/0075108 | 7/2007 |

(Continued)

OTHER PUBLICATIONS

Third Generation Partnership Project 2, "Over-the-Air Service Provisioning of Mobile Stations in Spread Spectrum Standards; Release D," 3GPP 2, C.S0016-D, Version 1.0 (Jan. 25, 2010).

(Continued)

*Primary Examiner* — Amancio Gonzalez
(74) *Attorney, Agent, or Firm* — Jenkins, Wilson, Taylor & Hunt, P.A.

(57) ABSTRACT

Systems, methods, and computer readable media for providing dynamic steering of roaming in a telecommunications network are disclosed. According to one aspect, a method for providing dynamic steering or roaming in a telecommunications network includes a method for providing dynamic steering or roaming in a telecommunications network. The method includes, at a mobile telecommunications device, the device being associated with a subscriber of a first network, detecting a trigger condition for updating a roaming preference, where the trigger condition is not controlled by the operator of the first network, determining an identity of a second network, and performing at least one of: making a change to a preferred roaming network for the device by setting the second network as a preferred roaming network for the device, and connecting to the second network.

44 Claims, 9 Drawing Sheets

(56) References Cited

U.S. PATENT DOCUMENTS

| | | | |
|---|---|---|---|
| 5,915,214 | A | 6/1999 | Reece et al. |
| 5,978,677 | A | 11/1999 | Sawyer |
| 6,363,251 | B1 | 3/2002 | Huang et al. |
| 6,564,055 | B1 * | 5/2003 | Hronek ................. 455/433 |
| 7,089,001 | B2 | 8/2006 | Leung et al. |
| 7,123,912 | B2 | 10/2006 | Kim et al. |
| 7,319,857 | B2 * | 1/2008 | Baldwin et al. ........... 455/412.1 |
| 7,433,929 | B2 | 10/2008 | Guilford et al. |
| 7,505,756 | B2 | 3/2009 | Bahl |
| 7,551,926 | B2 | 6/2009 | Rune |
| 7,587,598 | B2 | 9/2009 | Ohba et al. |
| 7,698,443 | B2 | 4/2010 | Yaffe et al. |
| 7,706,788 | B2 | 4/2010 | Ascolese et al. |
| 7,770,786 | B1 * | 8/2010 | Birch et al. ............... 235/379 |
| 7,826,844 | B2 | 11/2010 | Cooper |
| 7,885,654 | B2 * | 2/2011 | Fadell ................ 455/435.2 |
| 7,916,685 | B2 | 3/2011 | Schaedler et al. |
| 8,023,942 | B2 * | 9/2011 | Kumar et al. ............. 455/433 |
| 2004/0198356 | A1 | 10/2004 | Dunlop et al. |
| 2005/0064901 | A1 * | 3/2005 | Park et al. ............. 455/556.1 |
| 2006/0095365 | A1 | 5/2006 | Ravikumar et al. |
| 2006/0146792 | A1 | 7/2006 | Ramachandran et al. |
| 2006/0253894 | A1 | 11/2006 | Bookman et al. |
| 2007/0093202 | A1 | 4/2007 | Hwang et al. |
| 2007/0232307 | A1 * | 10/2007 | Ibrahim et al. ............. 455/436 |
| 2007/0254646 | A1 * | 11/2007 | Sokondar ................. 455/432.1 |
| 2008/0227434 | A1 * | 9/2008 | Nitta et al. ............. 455/414.1 |
| 2008/0232574 | A1 | 9/2008 | Baluja et al. |
| 2009/0041011 | A1 | 2/2009 | Sheppard |
| 2009/0082019 | A1 | 3/2009 | Marsico |
| 2010/0217696 | A1 | 8/2010 | Schuba et al. |
| 2011/0202647 | A1 | 8/2011 | Jin et al. |
| 2011/0286395 | A1 | 11/2011 | Liebsch et al. |
| 2012/0081557 | A1 | 4/2012 | Kupinsky et al. |

FOREIGN PATENT DOCUMENTS

| | | |
|---|---|---|
| WO | WO 2005/069660 A1 | 7/2005 |
| WO | WO 2007/043849 A1 | 4/2007 |
| WO | WO 2009/042670 A1 | 4/2009 |

OTHER PUBLICATIONS

Applicant-Initiated Interview Summary for U.S. Appl. No. 12/192,737 (Sep. 28, 2011).

Final Official Action for U.S. Appl. No. 12/192,737 (May 24, 2011).

Non-Final Office Action for U.S. Appl. No. 12/192,737 (Dec. 22, 2010).

Notification of Transmittal of the International Search Report and the Written Opinion of the International Searching Authority, or the Declaration of International Application No. PCT/US2008/077500 (Feb. 26, 2009).

Final Office Action for U.S. Appl. No. 13/244,245 (Sep. 25, 2014).

Non-Final Office Action for U.S. Appl. No. 13/244,245 (Mar. 21, 2014).

Email to U.S. Patent and Trademark Office dated Jun. 28, 2013.

"Gumption: Awarea: Taking RFID to the Streets," Joe McCarthy, pp. 1-4, gumption.typepad.com/blog/2006/03/awarea_taking_r.html (Mar. 10, 2006).

"3rd Generation Partnership Project; Technical Specification Group Core Network and Terminals; Policy and Charging Control over Gx reference point (Release 9)," 3GPP TS 29.212 V9.2.0 (Mar. 2010).

"Test Set for RFID-Enabled Phones," Jonathan Collins, pp. 1-2, RFID Journal, Inc. (2005).

"Cell Phone Service Providers Start Global NFC Initiative," Claire Swedberg, pp. 1-2, RFID Journal, Inc. (2005).

\* cited by examiner

US 9,008,653 B2

SYSTEMS, METHODS, AND COMPUTER READABLE MEDIA FOR PROVIDING DYNAMIC STEERING OF ROAMING IN A TELECOMMUNICATIONS NETWORK

PRIORITY CLAIM

This application claims the benefit of U.S. Provisional Patent Application Ser. No. 61/089,338, filed Aug. 15, 2008; the disclosure of which is incorporated herein by reference in its entirety.

TECHNICAL FIELD

The subject matter described herein relates to methods and systems for roaming of mobile subscribers in a telecommunications network. More particularly, the subject matter described herein relates to systems, methods, and computer readable media for providing dynamic steering of roaming in a telecommunications network.

BACKGROUND

Mobile telecommunications devices, such as cell phones, mobile phones, and the like, are typically configured to attempt to connect to the mobile or cellular network to which the user of the device is a subscriber. This network is referred to as the subscriber's home network or sometimes simply as the "home network" (HN), and the network operator that controls the home network is referred to as the home network operator (HNO), or simply the "home operator." If the device cannot connect to the subscriber's home network, it typically will attempt to connect to networks other than the subscriber's home network. A network other than the home network is referred to as the roaming carrier network, or simply the "roaming network" (RN). The network operator that controls the roaming network is referred to as the roaming network operator (RNO), or simply as the "roaming operator".

Since it is possible that the same geographic area may be served by more than one cellular telecommunications network, e.g., a mobile phone may be within radio contact distance of cellphone towers that are owned and operated by more than one network operator or network provider, there may be a number of networks with which the mobile device may connect. For this reason, the mobile device may include a prioritized list of networks to which the mobile device should try to connect.

In one example, a user of a mobile device is a subscriber to network service provider A. Network service provider A has entered into an agreement with network service provider B to provide roaming service for each other, but network service provider A does not have such an agreement with network service provider C. In this scenario, the mobile device may be configured to attempt to connect to network A whenever possible, but to connect to network B if no towers owned by network service provider A are within range of the mobile device. If the mobile device cannot connect to its home network A or roaming network B, the mobile device may be configured to then attempt to connect to network C, or it may be configured such that the mobile device can connect to network C only for calls to an emergency number, such as "911" in the United States.

One example of such a prioritized list of networks to which the mobile device may connect is the preferred roaming list, or PRL. The PRL is a database, which the mobile device uses during the system selection and acquisition process. The PRL may be maintained in a subscriber identity module (SIM) or a removable user identity module (RUIM). The PRL indicates which frequency bands and sub bands and service provider identifiers will be scanned and in what priority order. In conventional mobile devices, the PRL is controlled by the home network operator. The subscriber has no control over the content of the PRL other than the ability to send a request to the HNO to download the latest PRL to the phone via the over-the-air (OTA) interface. In some cases, the HNO may update or change the PRL of a subscriber's phone via the OTA without the subscriber's knowledge or permission.

As used herein, the term mobile network operator (MNO) refers to a company that has frequency allocation(s) and all the required infrastructure to run an independent mobile network. A company that provides mobile phone service but does not have its own licensed frequency allocation of radio spectrum, nor does it necessarily have all of the infrastructure required to provide mobile telephone service is referred to as a mobile virtual network operator (MVNO). MVNOs are roughly equivalent to the "switchless resellers" of the traditional landline telephone market. Switchless resellers buy minutes wholesale from the large long distance companies and retail them to their customers. An MNO that does not have a frequency spectrum allocation in a particular geographical region may operate as an MVNO in that region.

MVNOs can operate using the same technology, and often the same infrastructure, that MNOs use, such as such as Code Division Multiple Access (CDMA), GSM and the Universal Mobile Telecommunications System (UMTS). Usually, the MVNO does not own any GSM, CDMA or other core mobile network related infrastructure, such as mobile switching centers (MSCs), or a radio access network. Some may own their own home location register (HLR), which allows more flexibility and ownership of the subscriber's mobile phone number (MSISDN)—in this case, the MVNO appears as a roaming partner to other networks abroad, and as a network within its own region.

An MVNO may desire to increase its revenue by increasing the number of subscribers who choose the MVNO as the home network or who select the MVNO as the preferred roaming network. In order to provide such incentives to subscribers, an MVNO may enter into a business arrangement with a retailer or other commercial entity, in which the MVNO rewards the retailer for directing potential subscribers to use or try the MVNO.

In conventional networks, however, neither the subscriber, an MVNO, or a retailer has the means or opportunity to control the content of the PRL or to select a particular network as the preferred roaming network carrier, since the content of the PRL is controlled solely by the home network operator. Thus, there exists a need for systems, methods, and computer readable media for providing dynamic steering of roaming in a telecommunications network.

SUMMARY

According to one aspect, a method for providing dynamic steering or roaming in a telecommunications network includes a method for providing dynamic steering or roaming in a telecommunications network. The method includes, at a mobile telecommunications device, the device being associated with a subscriber of a first network, detecting a trigger condition for updating a roaming preference, where the trigger condition is not controlled by the operator of the first network, determining the identity of a second network, and performing at least one of: making a change to a preferred roaming network for the device by setting the second network as a preferred roaming network for the device, and connecting to the second network.

According to another aspect, the subject matter described herein includes a network element for providing dynamic steering or roaming in a telecommunications network. The network element includes a communications interface for sending and receiving messages within a telecommunications network. The network element also includes a steering and roaming module for receiving, from the communications interface, a first message sent by a mobile telecommunications device associated with a subscriber of a home network, the first message including information associated with a network that is different from the home network, and, responsive to receiving the first message, sending, to the device, a second message including information identifying a roaming network different from the home network. The information identifying the roaming network carrier may then used by the device to update a preferred roaming list on the device and/or to select a preferred roaming network for the device. In one embodiment, the network element receives from a device a short message service message including a short code address associated with a network that is different from the a subscriber's home network, and sends to the device a message that identifies a network for the device to use when roaming.

According to yet another aspect, the subject matter described herein includes a mobile telecommunications device for operating within a telecommunications network, the device associated with a subscriber of a home network. The device is configured to detect a trigger condition for updating a roaming preference, where the trigger condition is not controlled by the operator of the first network, determine the identity of a second network, and perform at least one of: making a change to a preferred roaming network for the device by setting the second network as a preferred roaming network for the device; and connecting to the second network.

According to yet another aspect, the subject matter described herein includes a system for providing dynamic steering or roaming in a telecommunications network. The system includes a network element for providing dynamic steering or roaming in a telecommunications network (network). The system also includes a mobile telecommunications device, associated with a subscriber of a home network, for operating within the telecommunications network. The device sends to the network element a first message including information associated with a network carrier that is different from the home network. In response to receiving the first message, the network element sends to the device a second message including information identifying a roaming network. In response to receiving the second message, the device updates a preferred roaming list on the device and/or selects the identified roaming network as the preferred roaming network carrier for the device.

The subject matter described herein for providing dynamic steering of roaming in a telecommunications network may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the processor to perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for providing dynamic steering or roaming in a telecommunications network.

Figure 1:
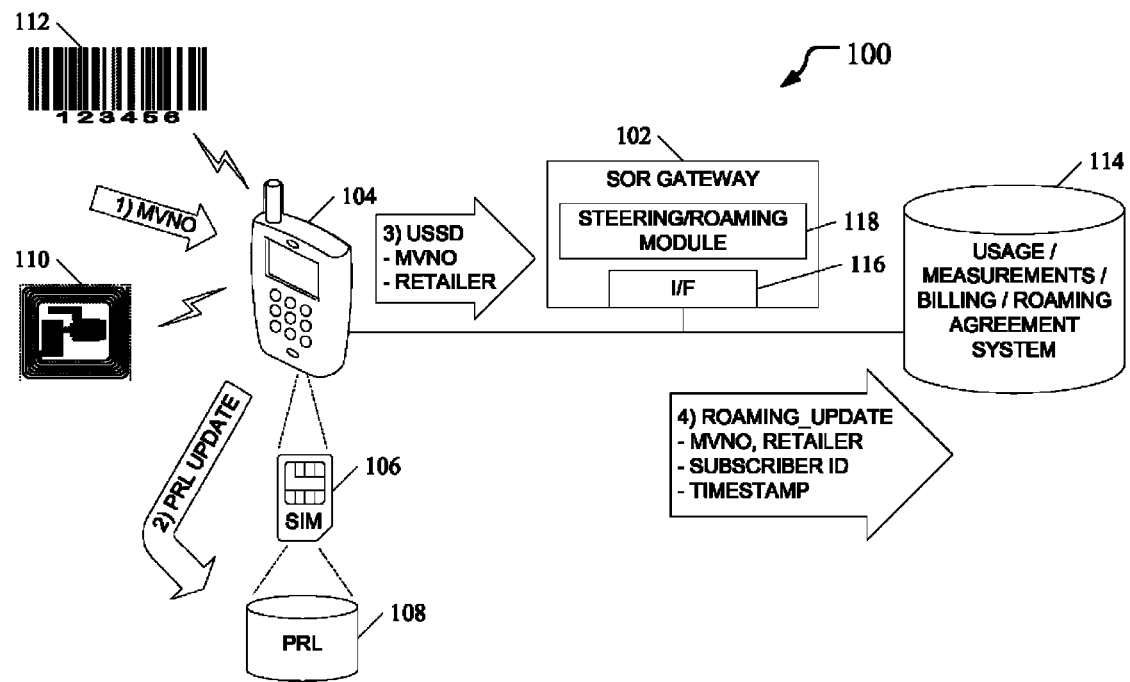
FIG. 1 is a block diagram illustrating an exemplary system for providing dynamic steering or roaming in a telecommunications network according to an embodiment of the subject matter described herein.

FIG. 1 is a block diagram illustrating an exemplary system for providing dynamic steering or roaming in a telecommunications network according to an embodiment of the subject matter described herein. In the embodiment illustrated in FIG. 1, telecommunications network 100 includes a network element, such as steering or roaming (SOR) gateway 102, for providing dynamic steering or roaming in the telecommunications network. A mobile telecommunications device 104 operates within network 100. Device 104 is associated with a subscriber of a first network carrier, e.g., the subscriber's home network. Device 104 receives, from a source other than an operator of the first network carrier, information associated with a second network carrier that is different from the first network carrier (FIG. 1, message 1). In one embodiment, device 104 makes a change to a preferred roaming carrier for the device by setting the second network carrier as the preferred roaming network carrier for the device. In an alternative embodiment, device 104 may connect to the second network carrier without changing the preferred roaming network carrier for device 104.

In one embodiment, device 104 makes a change to a preferred roaming carrier by updating a preferred roaming list, or PRL (FIG. 1, message 2), on the device. In the embodiment illustrated in FIG. 1, device 104 may include a SIM card 106 or a RUIM card on which the PRL 108 is stored. Device 104 may modify its own PRL 108 to include the second network carrier in the list of preferred roaming networks, if the second network carrier was not already in the preferred roaming list. Alternatively, device 104 may change the order of entries in the prioritized list of preferred roaming network carriers, such as to place the second network carrier at the top of the list. Device 104 may also connect to a roaming network as a result of the change to PRL 108, which may include disconnecting from a previous preferred roaming network and connecting to a new preferred roaming network, such as the second network carrier, if device 104 happens to be roaming at the time of the change to PRL 108, for example.

Device 104 may receive information from a variety of sources other than the home operator. For example, in the embodiment illustrated in FIG. 1, device 104 may receive information from a radio frequency identification (RFID) tag 110 via a near-field communication (NFC) or other proximity transceiver located within device 104. In one embodiment, the RFID tag may be similar in size and shape to a credit card, a gift coupon or gift card, a key fob, etc. In the embodiment illustrated in FIG. 1, device 104 may receive the information from a barcode 112 or other symbol tag read via a camera or optical scanner included within or attached to device 104. Alternatively, device 104 may receive the information via Bluetooth® or other wireless technology supported by device 104, or via some other means for communicating with device 104.

The information associated with the roaming network may include, but is not limited to, a name of the roaming network, a frequency band or sub-band of the roaming network, or other identifier of the roaming network. The information associated with the roaming network may be information identifying an operator of the roaming network. The operator of the roaming network may be, but is not limited to, a mobile network operator (MNO) or a mobile virtual network operator (MVNO).

In one embodiment, device 104 may issue a first notification message (FIG. 1, message 3) including information identifying the roaming network. The first notification message may include information identifying device 104 or a subscriber associated with device 104, a timestamp for the notification message, or other information. For example, in the embodiment illustrated in FIG. 1, the first notification message is an unstructured supplementary service data (USSD) message that includes information identifying an MVNO as the preferred roaming network carrier and information identifying a retailer with whom the MVNO has previously negotiated a business agreement.

In one embodiment, the first notification message may be sent to a mobility management node within the subscriber's home network, such as a home location register (HLR) or home subscriber server (HSS), to inform the home network carrier of the change of preferred roaming network carrier, e.g., the change made to the PRL.

SOR gateway 102 may receive the first notification message from device 104, detect that the notification is related to a change of the preferred roaming network carrier, and log or record this information. In the embodiment illustrated in FIG. 1, SOR gateway 102 may generate a second notification message, such as a roaming_update message (FIG. 1, message 4) to a node in the subscriber's home network 114, such as a home location register (HLR) or other node for maintaining information including, but not limited to, usage, measurements, billing, or roaming agreements, to notify the subscriber's home network operator of the change.

Examples of first and second notification messages include, but are not limited to, a USSD message, a short message service (SMS) message, an instant messaging (IM) message, and a session initiation protocol (SIP) message. The first and second notification messages may contain information including, but not limited to, information identifying a roaming network carrier, information identifying a subscriber, information identifying a retailer, and a timestamp.

SOR gateway 102 may be a node within the subscriber's home network or a node within a roaming network. In one embodiment, SOR gateway 102 is a node within the subscriber's home network. For example, device 104 may change the PRL and issue the first notification while the subscriber is still within the subscriber's home network. In this embodiment, SOR gateway 102 may operate as a proxy for the subscriber's HLR 114. In this scenario, SOR gateway 102 may issue the second notification message to subscriber's HLR 114.

In an alternative embodiment, SOR gateway 102 is a node outside of the subscriber's home network. For example, device 104 may change the PRL and issue the first notification while the subscriber is currently roaming outside of the subscriber's home network. In this embodiment, SOR gateway 102 may operate as a proxy for the subscriber home network's HLR, or it may intercept the first notification message on its way to the subscriber home network's HLR and generate the second notification message to a node other than the subscriber home network's HLR. For example, the second notification message may be sent to a node for maintaining information including, but not limited to, usage, measurements, billing, roaming agreements, and so on.

SOR gateway 102 may include gateway functionality, such as a USSD gateway, an SMS gateway, a short message service center (SMSC), a message server, or other types of gateway functions. SOR gateway 102 may be or may be associated with a routing node. SOR gateway 102 may be associated with a signaling system 7 (SS7) node, such as a signal transfer point (STP); a session initiation protocol (SIP) node, such as a SIP router, SIP application server (SAS), or SIP proxy; an Internet protocol (IP) or other packet network node; or an Internet protocol multimedia subsystem (IMS) node, such as a call signaling control function (CSCF) node, or an HSS.

In one embodiment, the network element for providing dynamic steering or roaming in the telecommunications network, such as steering or roaming (SOR) gateway 102, may include a communications interface 116 for sending and receiving messages with telecommunications network 100, and a steering and roaming module 118 for receiving, from communications interface 116, a first message sent by a mobile telecommunications device, such as device 104, associated with a subscriber of a home network carrier, the first message including information associated with a network carrier that is different from the home network carrier. In response to receiving the first message, steering and roaming module 118 may send a second message to device 104, the second message including information identifying a roaming network carrier different from the home network carrier.

Figure 2:
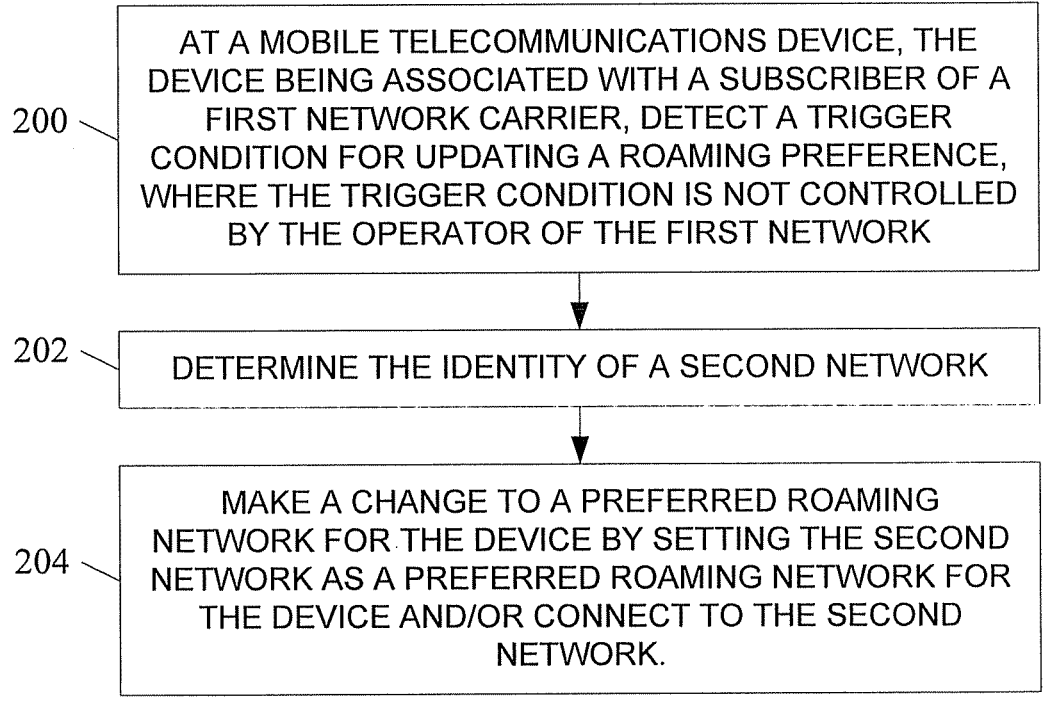
FIG. 2 is a flow chart illustrating an exemplary process for providing dynamic steering or roaming in a telecommunications network according to an embodiment of the subject matter described herein.

FIG. 2 is a flow chart illustrating exemplary processes for providing dynamic steering or roaming in a telecommunications network according to an embodiment of the subject matter described herein.

Referring to the embodiment illustrated in FIG. 2, at block 200, a mobile telecommunications device, the device being associated with a subscriber of a first network, e.g., the subscriber's home network, detects a trigger condition for updating a roaming preference, where the trigger condition is not controlled by the operator of the first (i.e., the home) network. In one embodiment, mobile device 104 receives, from a source other than an operator of the first network, information associated with a second network that is different from the home network, e.g., a roaming network carrier. For example, mobile device 104 may receive information from RFID tag 106 or barcode 108 that identifies a mobile virtual network operator, MVNO (FIG. 1, message 1). In another embodiment, mobile device 104 may detect that a change in its geographic location, which may require it to search for another preferred roaming carrier.

At block 202, mobile device 104 determines the identity of a second network. In one embodiment, the information associated with the second network may directly identify the second network. For example, the information may be a name or other identifier of the second network. In another embodiment, the information associated with the second network may indirectly identify the second network. For example, the information may be a short code number to which the subscriber must send a text message, where the short code identifies an entity controlled by the second network operator.

At block 204, device 104 may make a change to a preferred roaming network for the device by setting the second network as a preferred roaming carrier for device 104, connect to the second network, or both. For example, mobile device 104 may modify the contents of PRL 108 located within SIM 106 to select MVNO as the preferred roaming network (FIG. 1, message 2). In the embodiment illustrated in FIG. 2, device 104 makes this change without help or permission from the subscriber's home network or home network operator.

Alternatively, device 104 may connect to the second network, where the second network is not a preferred roaming carrier for the device, without changing the preferred roaming network for device 104.

As used herein, the term "network carrier" is synonymous with the term "network".

Figure 3:
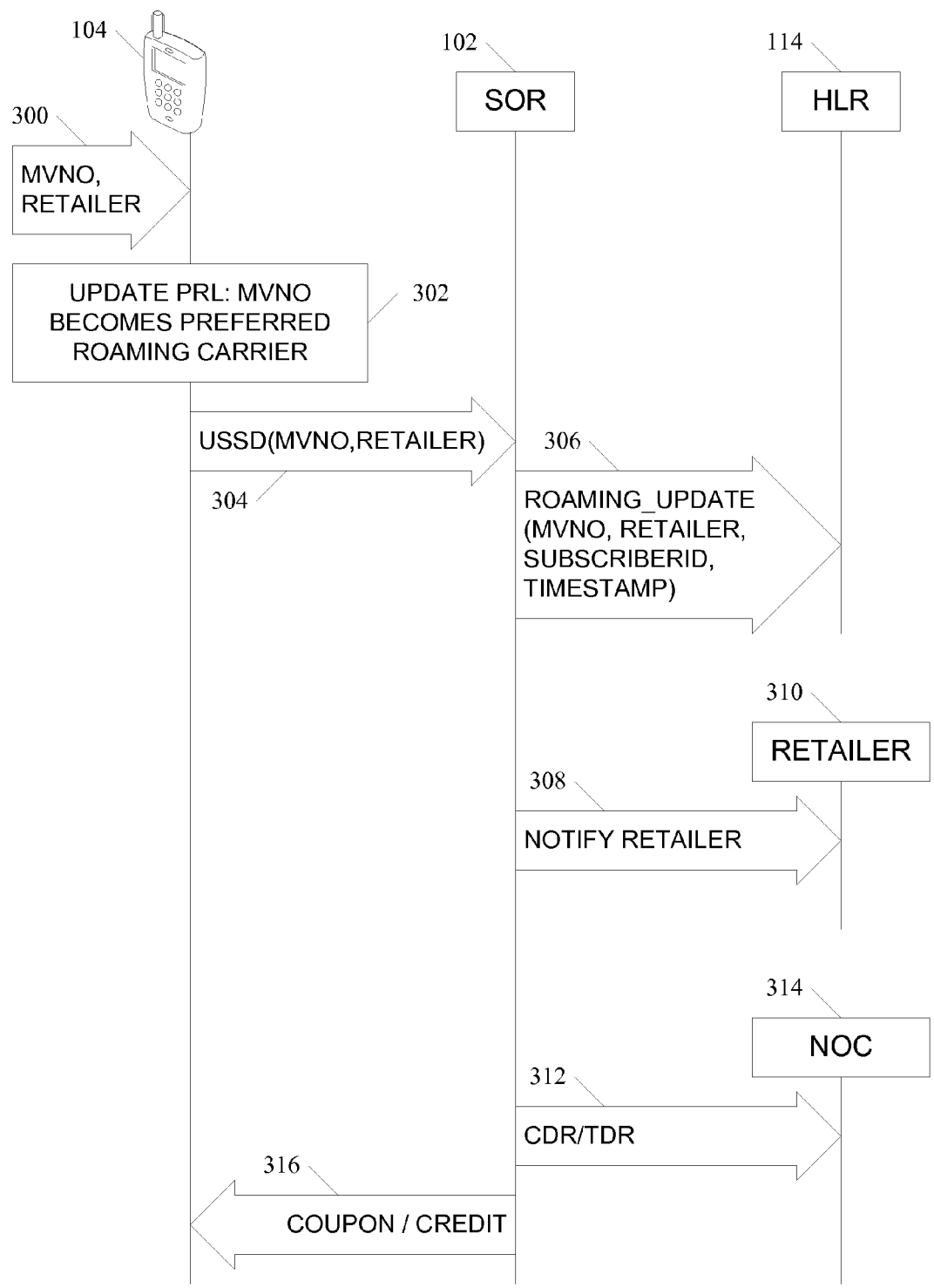
FIG. 3 is a signaling message flow diagram illustrating exemplary messages communicated in a system for providing dynamic steering of roaming in a telecommunications network according to an embodiment of the subject matter described herein.

FIG. 3 is a signaling message flow diagram illustrating exemplary messages communicated in a system for providing dynamic steering of roaming in a telecommunications network according to an embodiment of the subject matter described herein. In the embodiment illustrated in FIG. 3, device 104 receives message 300 including information identifying a roaming network carrier, which in this example is an MVNO but which could also be an MNO. At block 302, device 104 automatically updates PRL 108 such that MVNO becomes the preferred roaming carrier. In one embodiment, device 104 may automatically disconnect from the former preferred roaming network carrier, if currently connected, and connect to the new preferred roaming carrier. Alternatively, device 104 may be configured to prompt the subscriber before modifying PRL 108 and/or connecting to the new preferred roaming carrier.

In one embodiment, device 104 sends a first notification message 304 to SOR gateway 102, the message including the identify of the new preferred roaming carrier (MVNO) and identifying a retailer. SOR gateway 102 sends second notification message 306 to subscriber's HLR 114 to notify the subscriber's home network of the change to PRL 108. Message 306 identifies the new preferred roaming carrier MVNO, the retailer, and the subscriber, and also includes a timestamp.

In one embodiment, the timestamp may be used to limit the time during which MVNO will be the preferred roaming carrier. For example, subscriber's home network operator, HNO, may allow MVNO to be the preferred roaming carrier for an hour, day, week, or month, etc., after which time the HNO will reset PRL 108 to its default state or to a new state preferred by the HNO. Alternatively, MVNO may reward retailer for each day that device 104 continues to use MVNO as the preferred roaming network, in which case the timestamp may be used to start the clock or timer that records how many days MVNO remains the preferred roaming carrier for device 104.

As stated above, a network operator such as an MNO or MVNO may desire to provide incentives to mobile subscribers to select the MNO or MVNO as the preferred roaming operator. In one scenario, an MVNO may partner with a retailer, such as a coffee shop chain, whereby the retailer provides RFID cards or barcodes that, when scanned by device 104, instruct device 104 to select MVNO as the preferred roaming operator. The MVNO may reward the retailer based on the number of mobile devices that have changed their PRLs to select MVNO as the preferred roaming operator. Thus, in one embodiment, SOR gateway 102 may also send a message 308 to notify retailer 310 of the successful transaction and change of PRL 108 for device 104.

In one embodiment, SOR gateway 102 may also send a call detail record (CDR) or transaction detail record (TDR) 312 to a network operations center (NOC) 314 or other node for recording call or transaction details within the home network and/or the roaming network. In one embodiment, SOR gateway 102 may transmit some or all of the CDR/TDR details to retailer 310.

In one embodiment, SOR gateway 102 or an application associated with SOR gateway 102 may send an electronic coupon 316 or issue an electronic credit or some other type of compensation or reward to device 104 in response to receiving first notification message 304.

Figure 4:
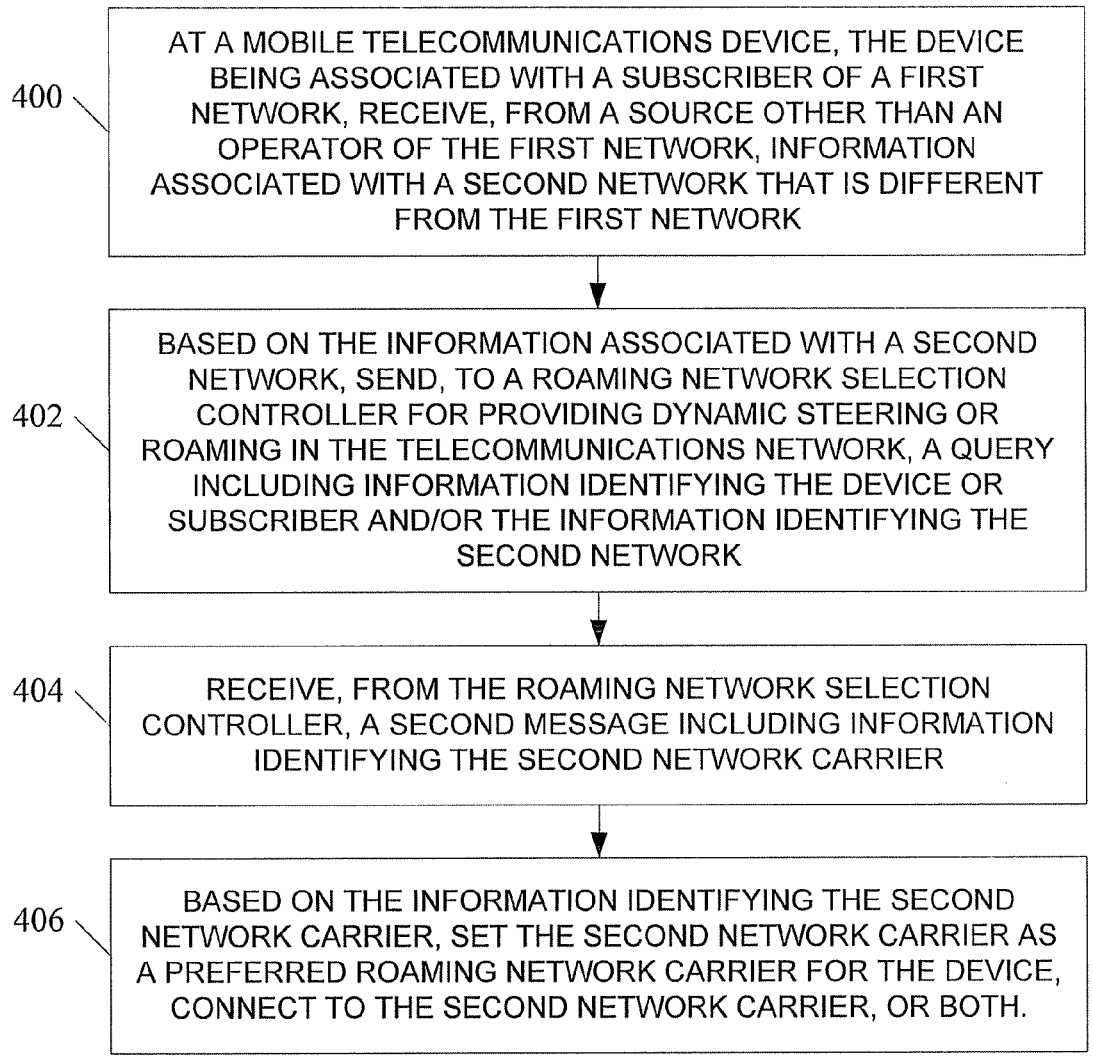
FIG. 4 is a flow chart illustrating an exemplary process for providing dynamic steering or roaming in a telecommunications network according to another embodiment of the subject matter described herein.

FIG. 4 is a flow chart illustrating exemplary processes for providing dynamic steering or roaming in a telecommunications network according to another embodiment of the subject matter described herein. Referring to the embodiment illustrated in FIG. 4, at block 400, a mobile telecommunications device, the device being associated with a subscriber of a first network carrier, e.g., the subscriber's home network, receives, from a source other than an operator of the first network carrier, information associated with a second network carrier that is different from the home network, e.g., a roaming network carrier. The information associated with the second network carrier may or may not directly identify the second network carrier. For example, mobile device 104 may receive information from RFID tag 106 or barcode 108 that identifies a retailer that has entered into an agreement with the second network carrier. Alternatively, the user of device 104 may see an advertisement which invites the user to send an SMS message to a short code in order to earn free roaming time, for example. The information associated with the second network carrier may also directly identify the second network carrier, similar to the method described in FIG. 2, above.

FIG. 4 illustrates an alternative embodiment, in which device 104 engages in communication to and from another node, which may be in the subscriber's home network or in a roaming network, for information or permission to change the preferred roaming list. At block 402, device 104 may, based on the information received, send a first message to a node, such as a roaming network selection controller, for providing dynamic steering or roaming in the telecommunications network. The message may include information identifying the device or the subscriber. In the embodiment illustrated in FIG. 4, device 104 communicates with SOR gateway 102.

At block 404, device 104 receives, from the roaming network selection controller, a second message including information identifying the second network carrier. For example, the first message may be received by SOR gateway 102, which may respond by sending to device 104 a second message that includes information identifying the second network carrier.

At block 406, based on the information identifying the second network carrier, device 104 may set the second network carrier as a preferred roaming carrier for device 104, connect to the second network carrier, or both. For example, device 104 may make a change to the contents or order of PRL 108 without also connecting to a roaming carrier, which may have just been updated to a new preferred roaming carrier. Alternatively, device 104 may be instructed to connect to the second network carrier without making any change to PRL 108. In yet another alternative, device 104 may update PRL 108 and also connect to the new preferred roaming carrier, either as a result of updating PRL 108 or in response to an explicit command from SOR gateway 102.

The information exchanged between device 104 and SOR gateway 102 may take several forms. In one embodiment, device 104 may transmit the identity of a network carrier that device 104 has already selected as the new preferred roaming carrier. In this embodiment, SOR gateway 102 may or may not send an acknowledgement of this change back to device 104.

In another embodiment, device 104 may request permission to select the identified second network carrier as the new preferred roaming carrier. In this embodiment, SOR gateway 102 may respond with a message that allows or denies this requested change.

In yet another embodiment, device 104 may transmit information that does not directly identify a network carrier but that is associated with a network carrier that is a potential candidate for being selected as the preferred roaming carrier. In this embodiment, SOR gateway 102 may use the information associated with the network carrier to determine the identity of the network carrier and pass that identity back to device 104, which may select the identified network carrier as the new preferred roaming carrier.

In yet another embodiment, device 104 may simply send a query to SOR gateway 102, asking SOR gateway to select an appropriate roaming carrier for device 104 to use and to send the identity of the selected roaming carrier to device 104. For example, in one embodiment, device 104 may make this request in response to determining its geographic location or determining that its geographic location has changed. In another embodiment, device 104 may make this request in response to receiving information (e.g., via a barcode scan, RFID scan, etc.) that identifies a retailer or goods or service. For example, in response to scanning a barcode that identifies a retailer, device 104 may generate and transmit to SOR gateway 102 a message that identifies the retailer, thereby requesting SOR gateway 102 to select an appropriate roaming carrier for device 104.

In one embodiment, SOR gateway 102 is adapted to maintain and enforce persistence rules or limits related to device-requested preferred roaming list changes. For example, SOR gateway 102 may authorize or acknowledge a preferred roaming carrier change for device 104 and after a predetermined period of time, may reset or modify the preferred roaming list and/or preferred roaming carrier for device 104. In another embodiment, SOR gateway 102 may maintain or access preferred roaming list state information for device 104, and use this information to monitor or track the preferred roaming carrier status for device 104 and to resolve or prioritize multiple preferred carrier requests by device 104.

Figure 5:
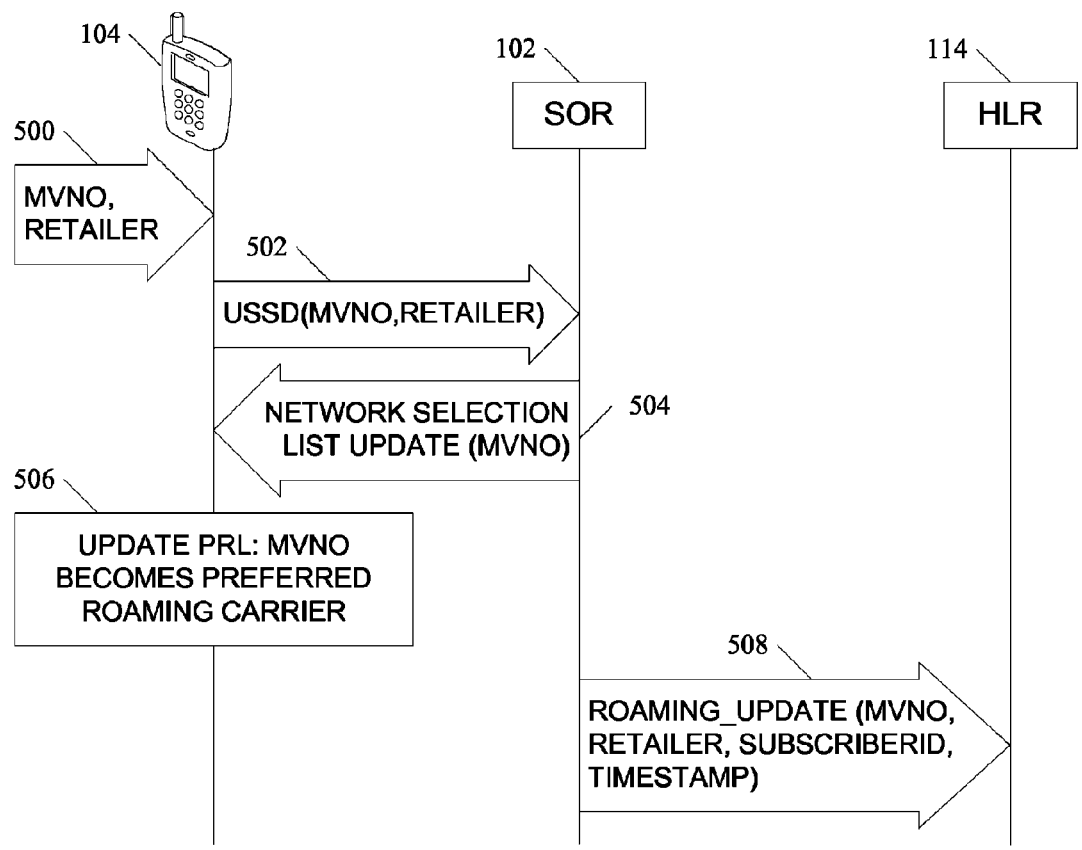
FIG. 5 is a signaling message flow diagram illustrating exemplary messages communicated in a system for providing dynamic steering of roaming in a telecommunications network according to another embodiment of the subject matter described herein.

FIG. 5 is a signaling message flow diagram illustrating exemplary messages communicated in a system for providing dynamic steering of roaming in a telecommunications network according to another embodiment of the subject matter described herein. In the embodiment illustrated in FIG. 4, device 104 receives message 500 including information identifying a roaming network carrier, but does not update PRL 108 immediately. Instead, it issues a first notification message 502 to SOR gateway 102, which responds with a message 504 that instructs device 104 to update PRL 108. In this embodiment, message 504 may be a network selection list update message that instructs device 104 to change PRL 108 such that MVNO is added to, raised, or put at the top of the preferred roaming list. At block 506, device 104 may the update PRL 108 in response to receiving message 504. SOR gateway 102 may issue second notification message 508 to a node in the subscriber's home network, such as HLR 114, or to the home network operator, to notify the home network of the change.

Figure 6:
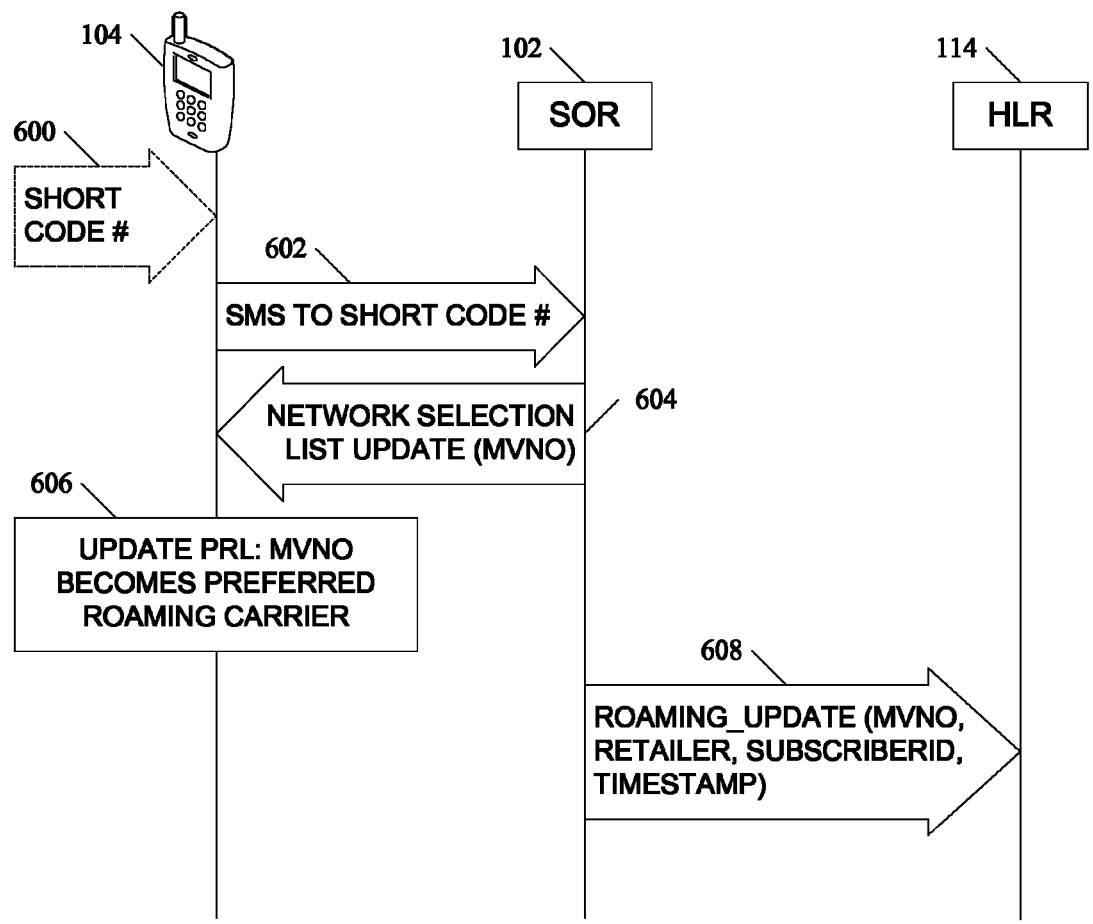
FIG. 6 is a signaling message flow diagram illustrating exemplary messages communicated in a system for providing dynamic steering of roaming in a telecommunications network according to yet another embodiment of the subject matter described herein.

FIG. 6 is a signaling message flow diagram illustrating exemplary messages communicated in a system for providing dynamic steering of roaming in a telecommunications network according to yet another embodiment of the subject matter described herein. In the embodiment illustrated in FIG. 5, device 104 receives information that may not directly identify a roaming carrier network, but is associated with a roaming carrier network. For example, subscriber may see an advertisement or promotion which promises free roaming minutes or some other incentive for subscriber to choose network provider MVNO as the subscriber's preferred roaming carrier.

In one embodiment, the subscriber is instructed to call or send an SMS message to a number or short code 600 associated with the MVNO or a retailer with whom the MVNO has a business arrangement. In the embodiment illustrated in FIG. 5, subscriber uses device 104 to send an SMS message 602 to a short code identified in the advertisement. SMS message 602 may contain information including, but not limited to, information identifying the promotion, such as a promotional code, and/or information identifying the retailer. Alternatively, SMS message 602 may include information directly identifying MVNO as the preferred roaming carrier. In one embodiment, the short code address implicitly identifies the selected roaming network operator.

In response to receiving the first notification message 602, SOR gateway 102 may respond with a message 604 that identifies MVNO as the new preferred roaming carrier. For example, in the embodiment illustrated in FIG. 5, SOR gateway 102 sends a network selection list update message to device 104. At block 606, device 104 may then update its preferred roaming list such that MVNO becomes the preferred roaming carrier. SOR gateway 102 may issue a second notification message 608 to the subscriber's home network.

Figure 7:
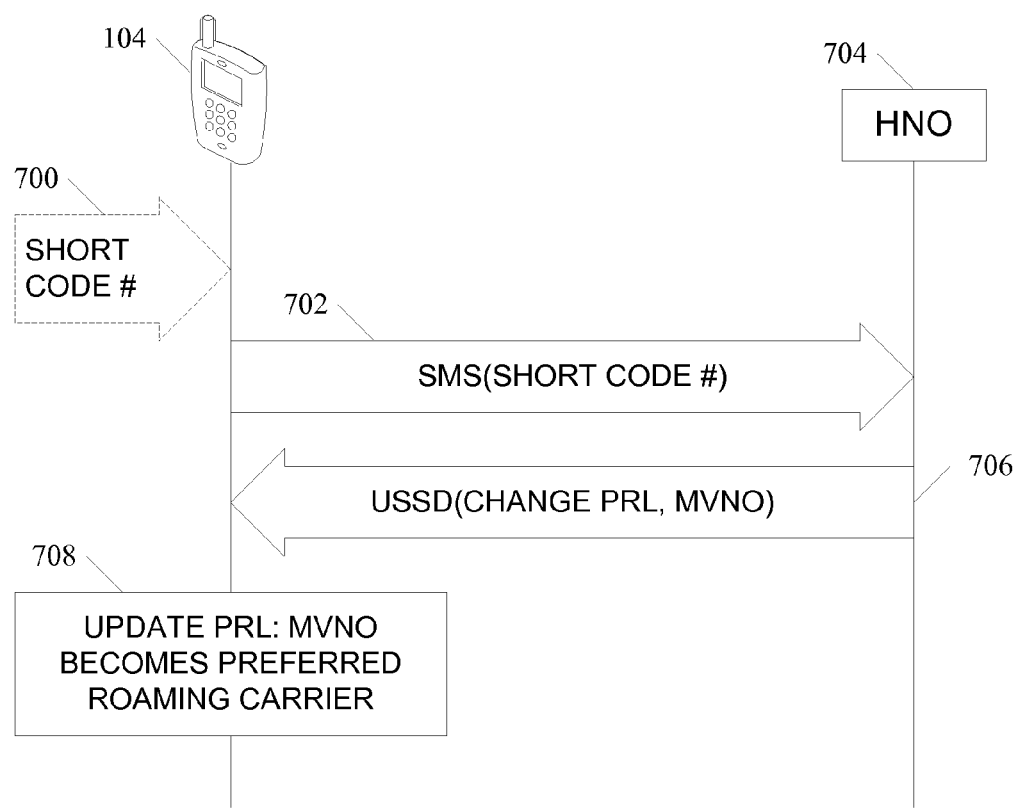
FIG. 7 is a signaling message flow diagram illustrating exemplary messages communicated in a system for providing dynamic steering of roaming in a telecommunications network according to yet another embodiment of the subject matter described herein.

FIG. 7 is a signaling message flow diagram illustrating exemplary messages communicated in a system for providing dynamic steering of roaming in a telecommunications network according to yet another embodiment of the subject matter described herein. In one embodiment, the subscriber is instructed to call or send an SMS message to a number or short code 700 associated with the MVNO or a retailer with whom the MVNO has a business arrangement. In the embodiment illustrated in FIG. 6, subscriber uses device 104 to send a text message 702, such as an SMS message, that is addressed to short code 700. Message 702 is sent to the subscriber's home network operator, HNO 704, which receives the message and subsequently signals device 104, e.g., via USSD message 706, to update its network selection list and optionally connect to MVNO. At block 708, device 104 responds to message 706 by updating its network selection list, e.g., PRL 108.

Figure 8:
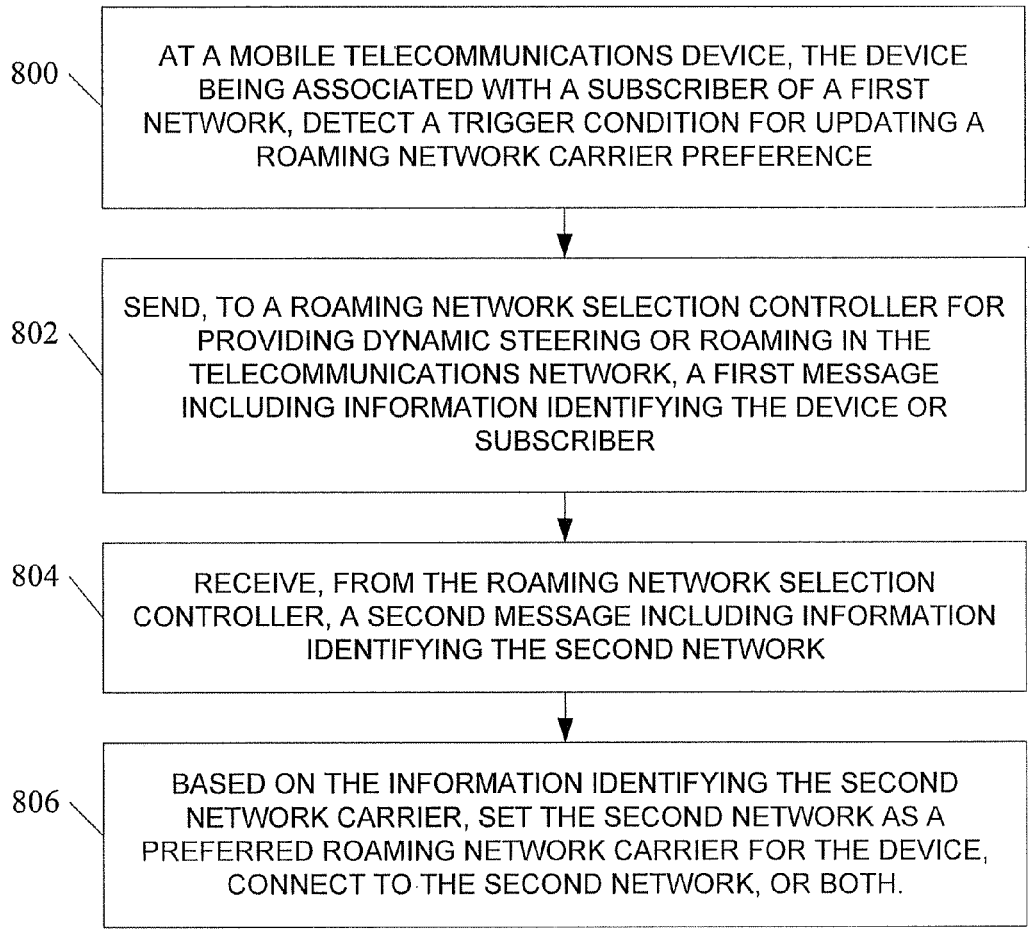
FIG. 8 is a flow chart illustrating an exemplary process for providing dynamic steering or roaming in a telecommunications network according to yet another embodiment of the subject matter described herein.

FIG. 8 is a flow chart illustrating an exemplary process for providing dynamic steering or roaming in a telecommunications network according to yet another embodiment of the subject matter described herein. Referring to the embodiment illustrated in FIG. 8, at block 800, a mobile telecommunications device, the device being associated with a subscriber of a first network carrier, e.g., the subscriber's home network, detects a trigger condition for updating a roaming network carrier preference. For example, device 104 may detect, or detect a change in, its geographical location.

At block 802, device 104 may, based on the information received, send a first message to a node, such as a roaming network selection controller, for providing dynamic steering or roaming in the telecommunications network. The message may include information identifying the device or the subscriber. For example, device 104 may communicate with SOR gateway 102.

At block 804, device 104 receives, from the roaming network selection controller, a second message including information identifying the second network carrier. For example, the first message may be received by SOR gateway 102, which may respond by sending to device 104 a second message that includes information identifying the second network carrier.

At block 806, based on the information identifying the second network carrier, device 104 may set the second network carrier as a preferred roaming carrier for device 104, connect to the second network carrier, or both.

Figure 9:
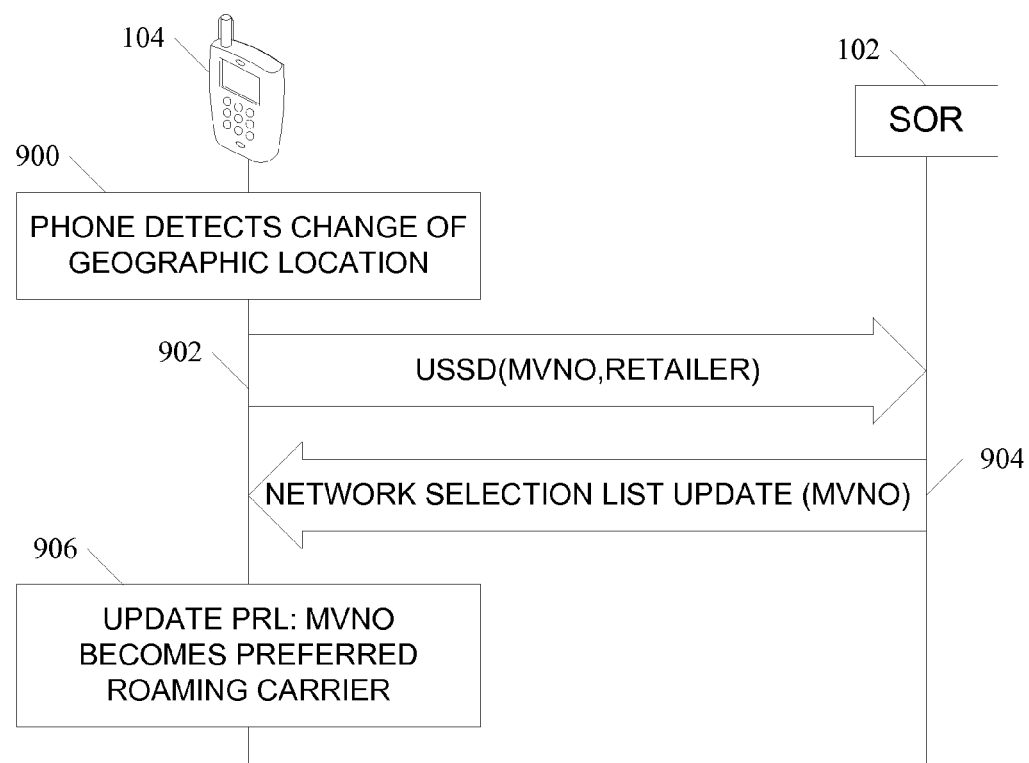
FIG. 9 is a signaling message flow diagram illustrating exemplary messages communicated in a system for providing dynamic steering of roaming in a telecommunications network according to yet another embodiment of the subject matter described herein.

FIG. 9 is a signaling message flow diagram illustrating exemplary messages communicated in a system for providing dynamic steering of roaming in a telecommunications network according to yet another embodiment of the subject matter described herein. In the embodiment illustrated in FIG. 9, at block 900, device 104 determines its location or detects a change in location, and automatically issues a message 902 to SOR gateway 102 requesting the identity of the preferred roaming carrier that device 104 should use. SOR gateway 102 may respond with a message 904 including information identifying the preferred roaming carrier. In the example illustrated in FIG. 9, SOR gateway 102 may indicate to device 104 that MVNO is the preferred roaming carrier. At block 906, device 104 modifies PRL 108 accordingly.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing dynamic steering or roaming in a telecommunications network, the method comprising:
    at a mobile telecommunications device, the device being associated with a subscriber of a first network:
        detecting a trigger condition, wherein detecting the trigger condition comprises receiving, via scanning of a bar code by a camera or optical scanner included within or attached to the mobile telecommunications device, information for updating a roaming preference; and
    in response to detecting the trigger condition, determining an identity of a second network, adding the second network as a preferred roaming network for the device, connecting to the second network wherein the identity of the second network is determined using network-identifying information that is provided to the mobile telecommunications device by a source other than the operator of the first network and by the scanning of the bar code, the second network being a mobile virtual network operated by a mobile virtual network operator, and generating a notification message identifying the mobile virtual network operator and a retailer.

2. The method of claim 1 wherein detecting a trigger condition for updating roaming preference comprises receiving, from the source other than an operator of the first network, information associated with an identity of the second network that is different from the first network and wherein determining an identity of a second network comprises using the information to determine the identity of the second network.

3. The method of claim 2 wherein the information associated with an identity of the second network comprises at least one of:
    a name of the second network;
    a frequency band used by the second network;
    a sub-band used by the second network;
    information identifying an operator of the second network;
    a directory number (DN);
    a short code;
    an address of a network node associated with the second network;
    and
    information identifying the second network.

4. The method of claim 2 wherein determining an identity of the second network comprises using the received information as the identity of the second network.

5. The method of claim 1 wherein determining an identity of the second network comprises sending a query to a roaming network selection controller for providing dynamic steering or roaming in the telecommunications network and receiving from the roaming network selection controller information identifying the second network.

6. The method of claim 5 wherein the query includes at least one of information identifying the device or subscriber and the information associated with the second network.

7. The method of claim 5 wherein the query message comprises one of:
    an unstructured supplementary service data (USSD) message;
    a short message service (SMS) message;
    an instant messaging (IM) message; and
    a session initiation protocol (SIP) message.

8. The method of claim 5 wherein the query message is sent automatically by the device in response to receiving the information associated with an identity of the second network that is different from the home network.

9. The method of claim 5 wherein the query message is a short message service (SMS) message sent by the subscriber.

10. The method of claim 9 wherein the SMS message is sent to a short code.

11. The method of claim 5 wherein the roaming network selection controller comprises a steering of roaming (SOR) gateway.

12. The method of claim 5 wherein the roaming network selection controller comprises at least one of:
- an unstructured supplementary service data (USSD) gateway;
- a short message service (SMS) gateway;
- a signaling network routing node;
- a short message service center (SMSC);
- a message server;
- a signaling system 7 (SS7) node;
- an Internet protocol (IP) node;
- a session initiation protocol (SIP) node; and
- an IP multimedia subsystem (IMS) node.

13. The method of claim 1 wherein adding the second network as a preferred roaming network for the device comprises updating a list of preferred roaming networks for the device.

14. The method of claim 13 wherein updating the list of preferred roaming networks for the device comprises modifying one of a network selection list of the device and a preferred roaming list (PRL) of the device.

15. The method of claim 13 wherein updating the list of preferred roaming networks for the device comprises modifying information maintained on one of a subscriber identity module (SIM) and a removable user identity module (RUIM) associated with the device.

16. The method of claim 1 wherein the first network comprises a home network of the subscriber and the second network comprises a roaming network of the subscriber.

17. The method of claim 1 wherein the notification message indicates the change or connection to the preferred roaming network for the device.

18. The method of claim 17 wherein the notification message is sent to at least one of:
- a home location register (HLR);
- a home subscriber server (HSS);
- a usage database;
- a measurements database;
- a billing database;
- a roaming agreement system; and
- a network operations center (NOC).

19. The method of claim 17 wherein the notification message comprises a roaming update message.

20. The method of claim 19 wherein the roaming update message includes at least one of:
- information identifying the subscriber; and
- a timestamp.

21. The method of claim 17 comprising receiving an electronic coupon at the device in response to sending the notification message.

22. A network element for providing dynamic steering or roaming in a telecommunications network, the network element comprising:
- a communications interface for sending and receiving messages within a telecommunications network; and
- a steering and roaming module for receiving, from the communications interface, a first message sent by a mobile telecommunications device associated with a subscriber of a home network, the first message including network-identifying information that is provided to the mobile telecommunications device by a source other than the operator of the first network via a bar code scanned by a camera or optical scanner included within or attached to the mobile telecommunications device, the bar code including the network identifying information and that is associated with a mobile virtual network that is different from the home network and that is operated by a mobile virtual network operator, the first message further including information identifying a retailer and, responsive to receiving the first message, using the network-identifying information to identify the mobile virtual network, which is different from the home network, and sending, to the device, a second message including information identifying the mobile virtual network.

23. The network element of claim 22 wherein at least one of the first and second messages comprises at least one of:
- an unstructured supplementary service data (USSD) message;
- a short message service (SMS) message;
- an instant messaging (IM) message; and
- a session initiation protocol (SIP) message.

24. The network element of claim 22 wherein the information associated with the mobile virtual network, which is different from the home network comprises at least one of:
- a name of the mobile virtual network;
- a frequency band used by the mobile virtual network;
- a sub-band used by the mobile virtual network; and
- information identifying an operator of the mobile virtual network.

25. The network element of claim 22 wherein the steering and roaming module is configured to send, responsive to receiving the first message, a third message notifying a network operator of the home network of the change of preferred roaming network for the device.

26. The network element of claim 25 wherein the third message comprises a roaming update message.

27. The network element of claim 25 wherein the third message includes at least one of:
- information identifying the subscriber; and
- a timestamp.

28. The network element of claim 22 wherein the steering and roaming module is configured to send, responsive to receiving the first message, an electronic coupon to the device.

29. The network element of claim 22 wherein the steering and roaming module is configured to maintain and enforce rules related to device-requested changes to a preferred roaming for the device.

30. The network element of claim 29 wherein the steering and roaming module is configured to:
- authorize requests to change a preferred roaming network for a device;
- impose a duration of time during which the device may not change its preferred roaming network;
- impose a duration of time after which the steering or roaming module will reset or modify a preferred roaming network for the device;
- maintain preferred roaming list state information for the device; and
- resolve or prioritize a plurality of preferred roaming network update requests by the device.

31. A mobile telecommunications device for operating within a telecommunications network, the device associated with a subscriber of a first network, the device configured to:
- detect a trigger condition, wherein detecting the trigger condition comprises receiving, via scanning of a bar code by a camera or optical scanner included within or attached to the mobile telecommunications device, information for updating a roaming preference; and
- in response to detecting the trigger condition, determine an identity of a second network, add the second network as a preferred roaming network for the device, connect to the second network, wherein the identity of the second network is determined using network-identifying information that is provided to the mobile telecommunications device by a source other than the operator of the first network and by the scanning of the bar code, the second network being a mobile virtual network operated by a mobile virtual network operator, and generate a notification message identifying the mobile virtual network operator and a retailer.

32. The mobile telecommunications device of claim 31 wherein the identity of the second network that is different from the first network comprises information identifying a roaming network.

33. The mobile telecommunications device of claim 31 wherein setting the second network as a preferred roaming network for the device comprises updating a list of preferred roaming networks for the device.

34. The mobile telecommunications device of claim 33 wherein updating the list of preferred roaming networks for the device comprises modifying one of a network selection list of the device and a preferred roaming list (PRL) of the device.

35. The mobile telecommunications device of claim 33 wherein updating the list of preferred roaming networks for the device comprises modifying information maintained on one of a subscriber identity module (SIM) and a removable user identity module (RUIM) associated with the device.

36. The mobile telecommunications device of claim 31 wherein updating the list of preferred roaming networks for the device based on the received information comprises:
    sending a first message to a network element in the telecommunications network, the first message including the received information associated with a network that is different from the home network;
    receiving a second message from the network element, the second message including information identifying a roaming network; and
    updating a list of preferred roaming networks for the device to establish the identified roaming network as the preferred roaming network for the device.

37. The mobile telecommunications device of claim 31 wherein the information associated with the network that is different from the home network comprises at least one of:
    a name of the second network;
    a frequency band used by the second network;
    a sub-band used by the second network; and
    information identifying an operator of the second network.

38. The mobile telecommunications device of claim 31 wherein the first message is sent automatically by the device in response to receiving the information associated with the network that is different from the home network.

39. The mobile telecommunications device of claim 31 wherein the first message is a short message service (SMS) message sent by the subscriber.

40. The mobile telecommunications device of claim 39 wherein the SMS message is sent to a short code.

41. The mobile telecommunications device of claim 31 wherein at least one of the first and second messages comprises at least one of:
    an unstructured supplementary service data (USSD) message;
    a short message service (SMS) message;
    an instant messaging (IM) message; and
    a session initiation protocol (SIP) message.

42. The mobile telecommunications device of claim 31 wherein selecting the identified roaming network as the preferred roaming network for the device. comprises modifying a network selection list on a subscriber identity module (SIM) of the device.

43. A system for providing dynamic steering or roaming in a telecommunications network, the system comprising:
    a network element for providing dynamic steering or roaming in a telecommunications network; and
    a mobile telecommunications device, associated with a subscriber of a first network, for operating within the telecommunications network,
    wherein the device sends to the network element a first message including network-identifying information that is provided to the mobile telecommunications device by a source other than the operator of the first network via a bar code scanned by a camera or optical scanner included within or attached to the mobile telecommunications device, the bar code including the network identifying information associated with a second network comprising a mobile virtual network operated by a mobile virtual network operator and that is different from the first network, the first message further including information identifying a retailer, and wherein, responsive to receiving the first message, the network element sends to the device a second message including information identifying the second network, and wherein, responsive to receiving the second message, the device adds the second network as a preferred roaming network for the device and connects to the second network.

44. A non-transitory computer readable medium having stored thereon computer-executable instructions that when executed by the processor of a computer control the computer to perform steps comprising:
    at a mobile telecommunications device (device) in a telecommunications network (network), the device being associated with a subscriber of a home network:
    detecting a trigger condition, wherein detecting the trigger condition comprises receiving, via scanning of a bar code by a camera or optical scanner included within or attached to the mobile telecommunications device, information for updating a roaming preference; and
    in response to detecting the trigger condition, determining an identity of a second network, adding the second network as a preferred roaming network for the device, connecting to the second network, wherein the identity of the second network is determined using network-identifying information that is provided to the mobile telecommunications device by a source other than the operator of the first network and by the scanning of the bar code, the second network being a mobile virtual network operated by a mobile virtual network operator, and generating a notification message identifying the mobile virtual network operator and a retailer.

* * * * *